United States Patent
Rougeaux

(10) Patent No.: US 10,552,675 B2
(45) Date of Patent: Feb. 4, 2020

(54) METHOD AND APPARATUS FOR EYE DETECTION FROM GLINTS

(71) Applicant: Seeing Machines Limited, Fyshwick (AU)

(72) Inventor: Sebastien Rougeaux, O'Connor (AU)

(73) Assignee: Seeing Machines Limited, Fyshwick (AU)

( * ) Notice: Subject to any disclaimer, the term of this patent is extended or adjusted under 35 U.S.C. 154(b) by 0 days.

(21) Appl. No.: 14/916,082

(22) PCT Filed: Sep. 1, 2014

(86) PCT No.: PCT/AU2014/000868
§ 371 (c)(1),
(2) Date: Mar. 2, 2016

(87) PCT Pub. No.: WO2015/027289
PCT Pub. Date: Mar. 5, 2015

(65) Prior Publication Data
US 2016/0210497 A1 Jul. 21, 2016

(30) Foreign Application Priority Data
Mar. 12, 2014 (AU) ................. 2014900842

(51) Int. Cl.
*G06K 9/00* (2006.01)
*G06F 3/01* (2006.01)

(52) U.S. Cl.
CPC ........... *G06K 9/0061* (2013.01); *G06F 3/013* (2013.01); *G06K 9/00281* (2013.01); *G06K 9/00604* (2013.01)

(58) Field of Classification Search
CPC ............. G06K 9/0061; G06K 9/00604; G06K 9/00281; G06K 9/00; G06F 3/013; G06F 3/01; G06T 7/004; G06T 7/00; G06T 7/20
(Continued)

(56) References Cited
U.S. PATENT DOCUMENTS
7,020,337 B2 3/2006 Viola et al.
7,460,693 B2 12/2008 Loy et al.
(Continued)

FOREIGN PATENT DOCUMENTS
JP 2012-065719 4/2012
JP 2012-239550 A 12/2012

OTHER PUBLICATIONS
Ying et al., "Robust Feature Extraction for Non-contact Gaze Tracking with Eyeglasses", Chinese Journal of Electronics, vol. 22, No. 2, Apr. 2013, pp. 231-236.
(Continued)

*Primary Examiner* — Thai Q Tran
*Assistant Examiner* — Nienru Yang
(74) *Attorney, Agent, or Firm* — Jason P. Mueller; Adams and Reese, LLP

(57) ABSTRACT

A method of determining the position of eyeballs within an image, the method including the steps of: (a) capturing a time series of image frames illuminated in a predetermined temporal manner by at least two spaced apart light sources, by at least one imaging sensor; (b) processing the image frames to determine specular reflection locations in the image frames; and (c) utilising the time series evolution of the location of the specular reflections to isolate corneal reflections from the determined specular reflection locations.

15 Claims, 6 Drawing Sheets

(58) Field of Classification Search
USPC .......................................................... 348/78
See application file for complete search history.

(56) References Cited

U.S. PATENT DOCUMENTS

| | | | |
|---|---|---|---|
| 7,747,068 B1* | 6/2010 | Smyth ................... | G03B 17/00 |
| | | | 382/154 |
| 8,243,133 B1* | 8/2012 | Northcott ........... | G06K 9/00604 |
| | | | 348/78 |
| 2004/0170304 A1* | 9/2004 | Haven .................... | A61B 3/113 |
| | | | 382/115 |
| 2007/0171367 A1* | 7/2007 | Sebastian ................ | A61B 3/00 |
| | | | 351/206 |
| 2011/0141010 A1* | 6/2011 | Sakata ................... | A61B 3/113 |
| | | | 345/156 |

OTHER PUBLICATIONS

Han et al., "Face Recognition Based on Near-Infrared Light Using Mobile Phone", Adaptive and Natural Computing Algorithms, Springer Berlin Heidelberg, pp. 440-448.
European Patent Application No. 14840504.6, "Supplemental European Search Report", dated Mar. 15, 2017.
Haro, A. et al, "Detecting and Tracking Eyes by Using Their Physiological Properties, Dynamics, and Appearance", Computer Vision and Pattern Recognition, 2000, vol. 1, pp. 163-168.
Morimoto, C.H. et al., "Pupil detection and tracking using multiple light sources", Image and Vision Computing, vol. 18, issue 4, 2000, pp. 331-335.

* cited by examiner

METHOD AND APPARATUS FOR EYE DETECTION FROM GLINTS

FIELD OF THE INVENTION

The present invention relates to the field of object detection and monitoring, and, in particular discloses a method and system for eye detection based on reflection structure. By way of example, embodiments of the invention are applicable in tracking the eye location of a user of a computer or mobile device (such as a smartphone or tablet), or a driver of a vehicle.

BACKGROUND

Any discussion of the background art throughout the specification should in no way be considered as an admission that such art is widely known or forms part of common general knowledge in the field.

Proper detection of eyes in sensed noisy images can be difficult, especially in the presence of glasses with the occlusion generated by their frame and the reflections occurring on the lenses.

Traditional computer vision algorithms for eye detection often rely on appearance (e.g. U.S. Pat. No. 7,020,337 to Viola and Jones entitled "System and method for detecting objects in images"). This method relies on training a model based on the appearance of the object to be detected and its robustness will degrade significantly in the presence of noise such as strong reflections and/or occlusions. Further, this method is relatively computationally intensive.

Another example is the method described in U.S. Pat. No. 7,460,693 to Loy and Thomsen entitled "Method and apparatus for the automatic detection of facial features". In this document the eyes are detected using a fast symmetry transform (using the circular symmetry of the iris) and then refined using a Hough transform (which detects circles in images). This method relies on the texture of the eyes and its performance will degrade significantly if the iris is partially occluded by specular reflections on the lenses of glasses for example.

In addition, certain prior art systems comprise whole eye detection modules running in parallel. Such systems have inherent disadvantages. For example, in some situations, the eye feature may occupy a significant portion of the image (e.g. for a phone camera held close to the face, it may be that 20% of the pixels will fall on the eye). In these circumstances, the eye detectors will have to operate over areas of the image that overlap by this amount, otherwise the eye will not be detectable (referred to herein as "the overlap problem"). The overlap creates additional redundant processing on the same pixel data and can create multiple detections of the same eye from different detectors which require further processing to disambiguate.

In addition, where the eye detector operates on multiple frames and the eye is moving (creating a trajectory), such prior art systems will not be able to resolve a trajectory that moves across the multiple eye detection regions. Instead it will report multiple trajectories with a discontinuity between them.

Therefore, there is a general need for a more robust form of eye detection in noisy or occluded images.

SUMMARY OF THE INVENTION

It is an object of the invention, in its preferred form to provide an improved form of image object detection, including the detection of eyes within an image.

In accordance with a first aspect of the present invention, there is provided a method of determining the position of at least one eyeball within an image, the method including the steps of: (a) capturing a time series of image frames illuminated in a predetermined temporal manner by at least two spaced apart light sources, by at least one imaging sensor; (b) processing the image frames to determine specular reflection locations in the image frames; and (c) utilising the time series evolution of the location of the specular reflections to isolate corneal reflections from the determined specular reflection locations.

The step (c) preferably can include utilising either a velocity or acceleration model of position evolution to model the location of the specular reflections corresponding to corneal reflections.

The isolate step preferably can include utilising an error measure between the model and the actual locations of the specular reflections in the image frames. The model preferably can include maximum velocity or accelerations.

In one embodiment, first and second light sources are included, wherein the first light source is actuated to illuminate one or both of the eyeballs during capture of even frames of the time series and the second light source is actuated to illuminate one or both of the eyeballs during capture of odd frames of the time series.

In another embodiment, a plurality of light sources is included, each light source being actuated to illuminate one or both of the eyeballs during capture of predetermined frames of the time series.

In accordance with a second aspect of the present invention, there is provided an image processing system for detecting the position of an eyeball within an image, the system including: at least two image illumination sources for illuminating the image area in a predetermined temporal manner; an image sensor for capturing a sequence of temporal frames of the image area; a processor configured to process the temporal frames to determine specular reflection locations in the temporal frames; and second processing means for isolating likely corneal reflections from the specular reflection locations of a series of temporal frames.

In accordance with a third aspect of the present invention, there is provided a method of tracking one or more objects within a series of images, the method including the steps of:
  (a) controlling at least two spaced apart light sources to illuminate the one or more objects during respective predetermined time periods;
  (b) during one of the predetermined time periods, controlling a camera to capture an image including the one or more objects, the image forming part of the image stream;
  (c) identifying specular reflections present in images;
  (d) applying one or more constraints to determine which of the specular reflections correspond to reflections from the one or more objects; and
  (e) outputting two-dimensional coordinates of the position of the one or more objects in at least a subset of the image frames.

The step of applying one or more constraints preferably includes applying a motion model of the one or more objects based on the position of the specular reflections in a plurality of images.

In accordance with a fourth aspect of the present invention, there is provided a computer program configured to perform a method according to the third aspect.

In accordance with a fifth aspect of the present invention, there is provided a computer system configured to perform a method according to the third aspect.

In accordance with a sixth aspect of the present invention, there is provided a device configured to perform a method according to the third aspect.

BRIEF DESCRIPTION OF THE DRAWINGS

Embodiments of the invention will now be described, by way of example only, with reference to the accompanying drawings in which.

DETAILED DESCRIPTION

The preferred embodiment provides a robust form of eye detection through the utilisation of the corneal reflection in a captured image. As the corneal reflection from the eye is usually still present, even in the presence of other strong reflections and noise, the detection and processing of corneal reflection location can provide a strong indicator of eye position and gaze.

Figure 1:
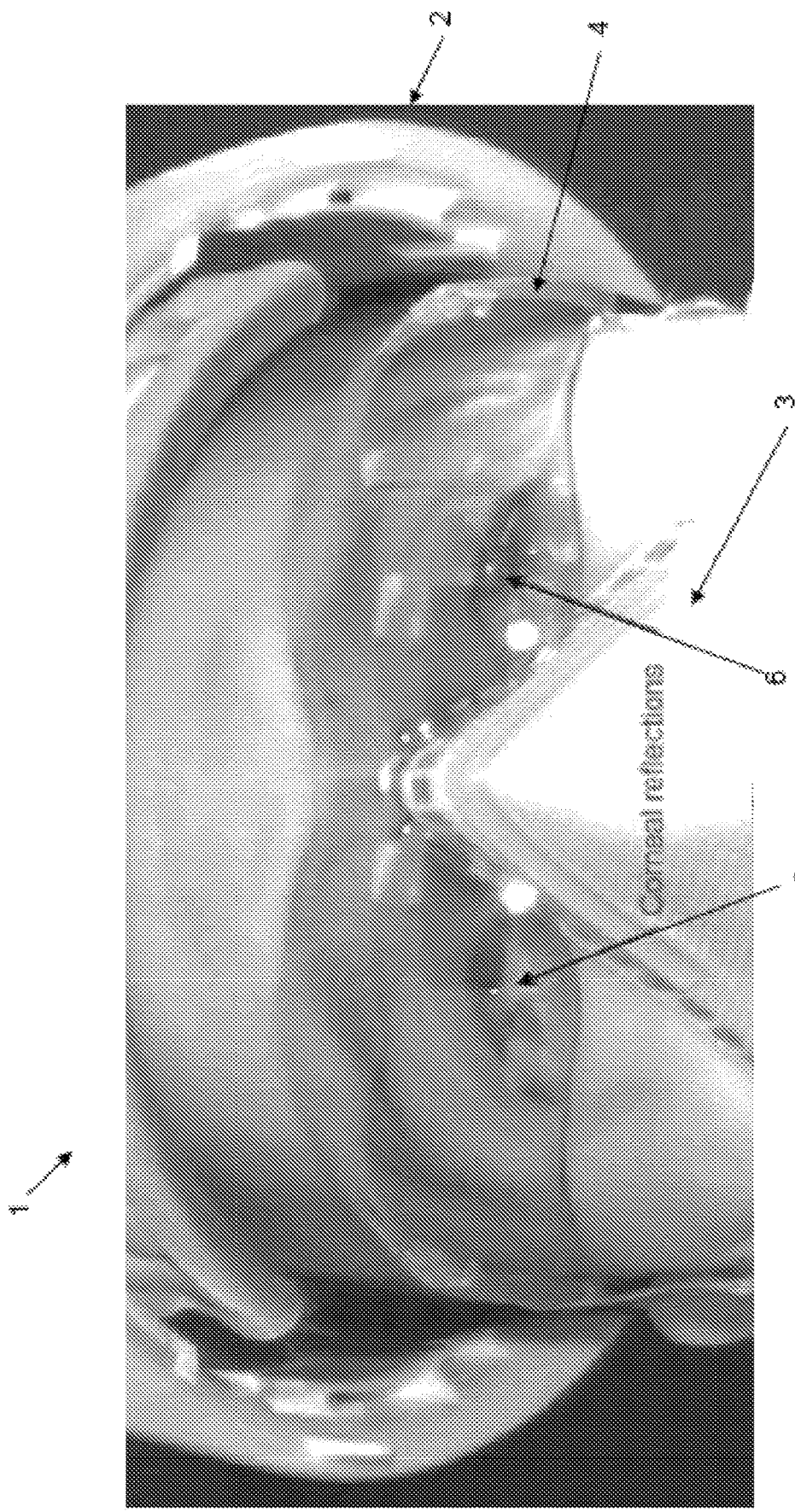
FIG. 1 illustrates a first example complex image having a series of specular reflections.

FIG. 1 illustrates an example noisy image 1 of a human head including hat 2, safety glasses 4 and air mask 3. From close examination of the image 1, it can be seen that two corneal reflections 5, 6 are also present in the image.

Figure 2:
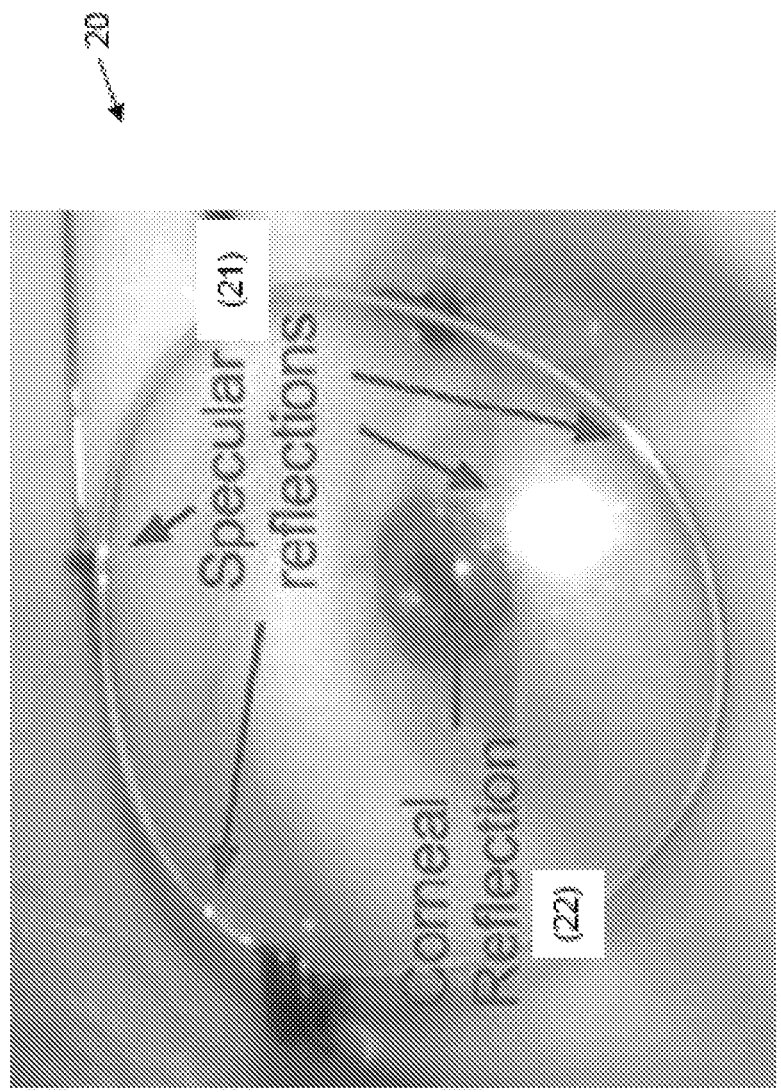
FIG. 2 illustrates a second example image having specular reflections.

FIG. 2 illustrates a second example image of an imaging device recording a view of a single eye having glasses 20. In this example, the light source produces a number of specular reflections 21, in addition to a targeted corneal reflection 22.

In the preferred embodiment, the presence of corneal specular reflections is utilised to advantage. The preferred embodiment uses at least one imaging device and at least two active light sources to determine the location of the corneal reflections. The light sources are synchronised with the imaging devices. A greater number of light sources gives higher accuracy glint detection and less detection errors. Where there is more than one imaging device, their integration periods are also synchronised. Exemplary imaging devices include digital cameras and CCD cameras.

The light sources can also be synchronized with the imaging device(s) integration period and can be actively controlled so that any combination of light sources can be ON or OFF for a given frame. Exemplary light sources include LEDs or other electronically controllable lights that can emit light for a predetermined time period in response to a control signal.

Figure 3:
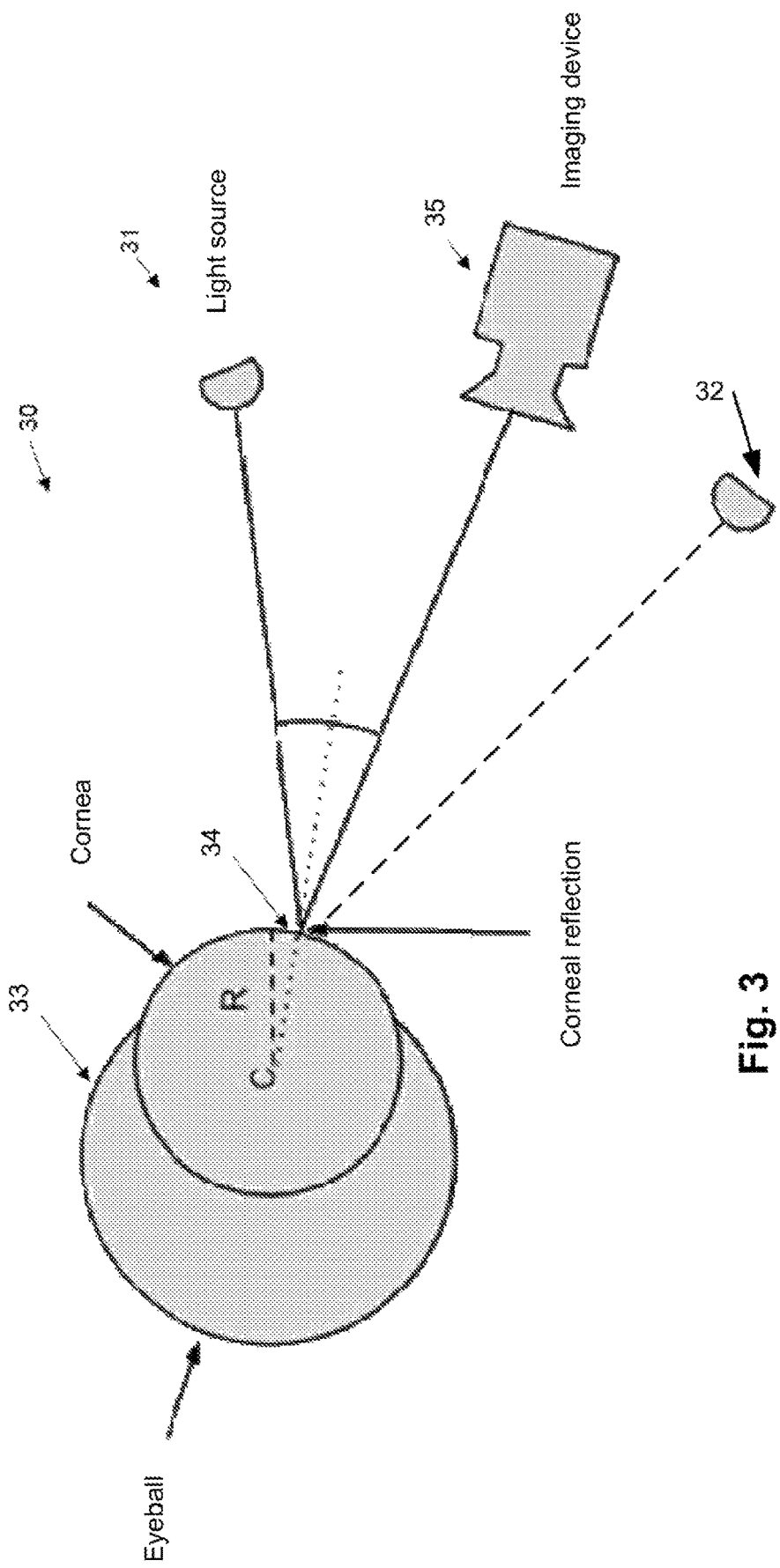
FIG. 3 illustrates schematically the geometry of creation of corneal reflections.

When a light source is ON, it produces a reflection (also called glint) on the surface of the cornea. FIG. 3 illustrates the process schematically 30, wherein light sources 31 and 32 are projected towards the eyeball 33, a corneal reflection 34 is detected by camera 35. Light sources 31 and 32 are spaced apart light so as to direct light at the cornea from different angles. This aids in better detection of glints, especially when one or both eyes are partially occluded.

The cornea surface can be modelled as any parametric surface. In a first example embodiment, the cornea is modelled as a sphere of centre C and radius R. The light sources 31 and 32 can also produce many other specular reflections, as illustrated in FIG. 1 and FIG. 2.

The proposed method of the preferred embodiment detects all the specular reflections in a sequence of images, and then using a constant motion model of the cornea (e.g., the cornea centre C is considered to move at constant velocity or constant acceleration in a 3D space), to evaluate which of the detected specular reflections are corresponding to corneal reflections.

Figure 4:
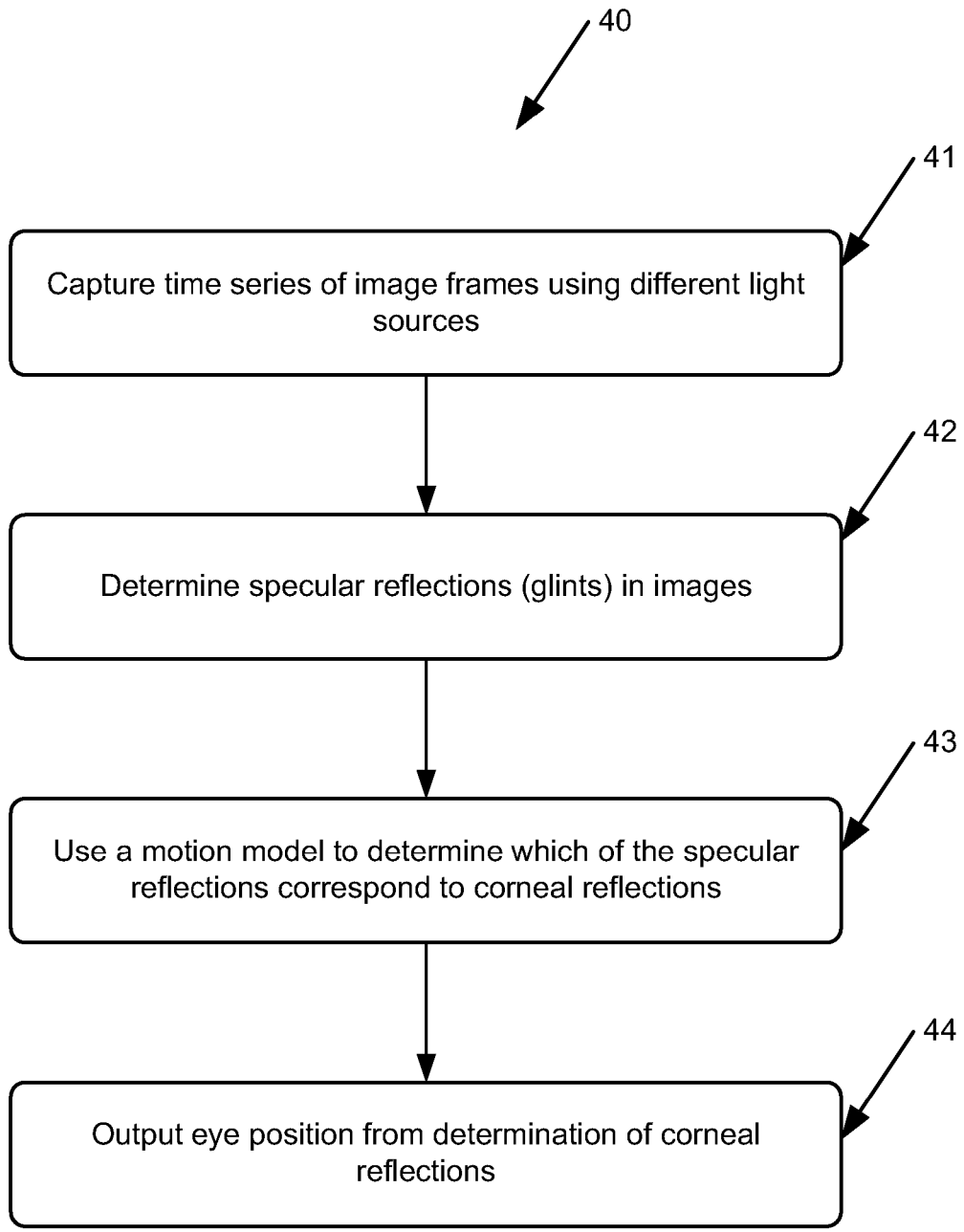
FIG. 4 illustrates a flow chart of the steps of the preferred embodiment.
Figure 5:
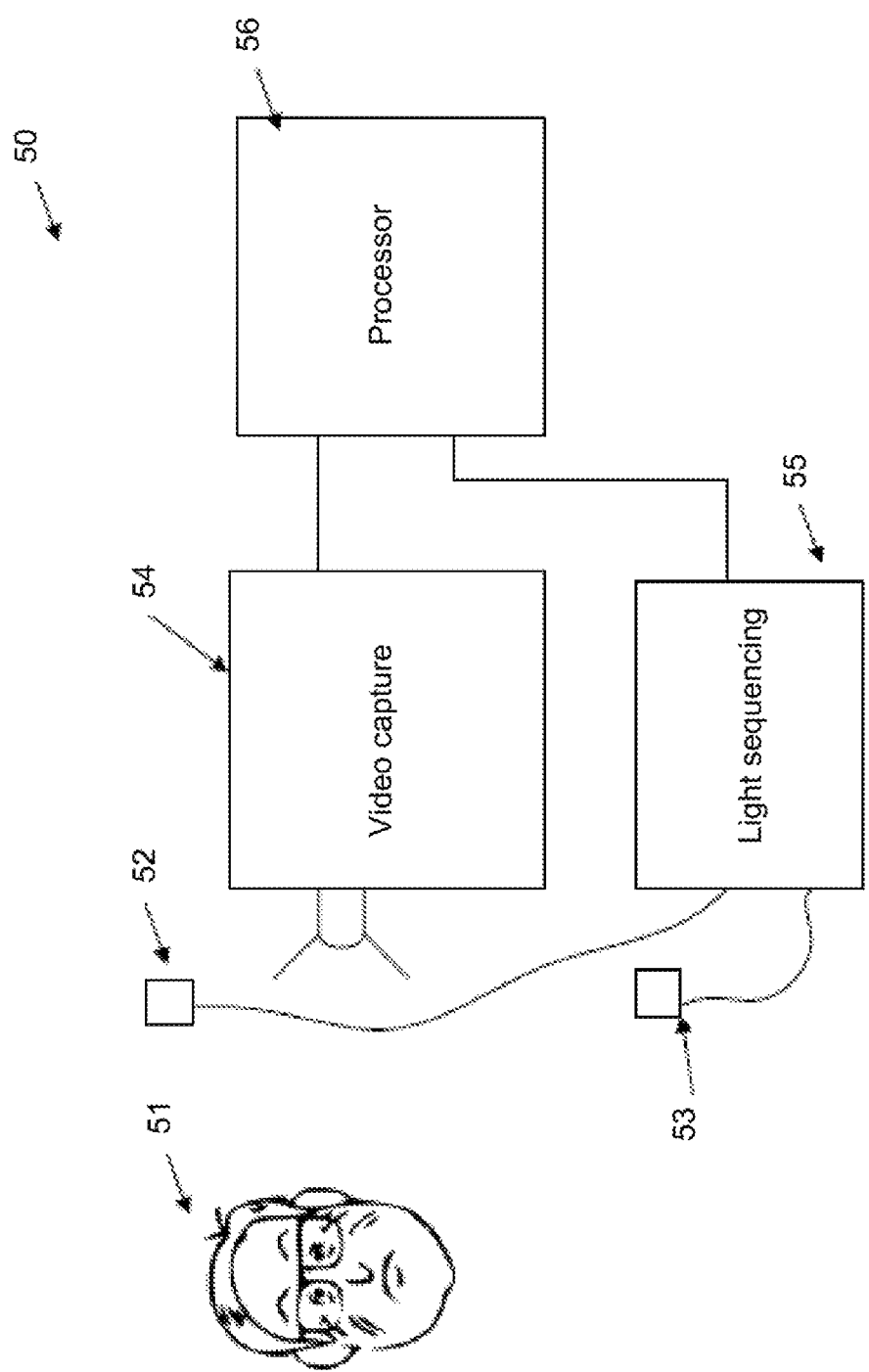
FIG. 5 illustrates an example processing system suitable for implementation of the preferred embodiment.

This procedure will now be described in detail with reference to FIG. 4, which illustrates a flow chart of the steps involved in a method 40 of determining the position of eyeballs within an image or a time series of images. Whilst the various embodiments of the invention can be implemented on many different hardware platforms (stand alone or mobile, PDA, Smart Phone etc), method 40 will be described with reference to the exemplary hardware illustrated in arrangement 50 of FIG. 5 having the exemplary configuration of FIG. 6.

In arrangement 50, a monitored subject 51 is subjected to sequenced infra red light sequencing from lights 52, 53 controlled by light sequencing microcontroller 55. Video is captured by a video capture unit 54. Unit 54 includes one or more digital cameras and optionally an internal processor. The video capture is processed by processor 56 in accordance with method 40 described below.

Figure 6:
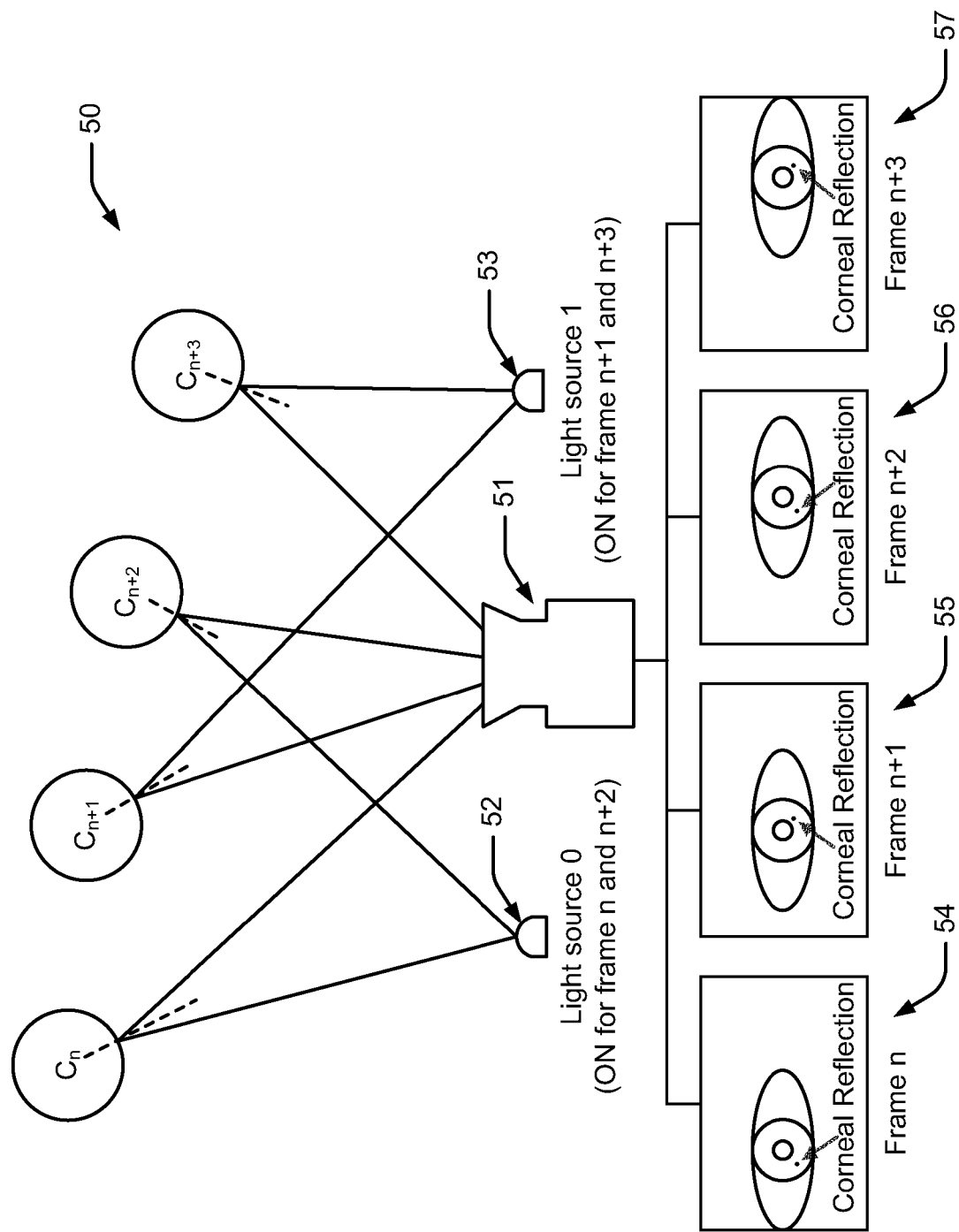
FIG. 6 illustrates the processing arrangement of the preferred embodiment.

First, at step 41, a time series of images of subject 51 is captured using unit 54. A subset of the time series is frames n to n+3 (57-60), as illustrated in FIG. 6. During the capture, the subject's eyeballs are illuminated by light sources 51 and 53. In a system using two light sources, illumination of sequential frames is preferably provided by a different light source in an alternating fashion. As shown in FIG. 6, light source 0 (52) is ON for the even numbered frames and light source 1 (53) is ON for the odd numbered frames. In systems using more than two light sources, it is preferable that the illumination profile varies by at least one of the light sources each frame. By way of example, in a system including three light sources (L1, L2 and L3), consecutive image frames in the time series may be illuminated using the following illumination sequence:

Frame 1: L1+L2
Frame 2: L1+L3
Frame 3: L2+L3
Frame 4: L1+L2+L3
Frame 5: L1+L2 . . .

This sequencing and is determined by sequencing microcontroller 55 in conjunction with processor 56 and capture unit 54. The timing of the illumination is synchronised with the capture of image frames in the time series. The general preference is that there is some variation in illumination profile (different actuated light sources or combinations of actuated light sources) between consecutive frames of the time series to better differentiate the specular reflections from noise.

At step 42, from the captured time series of images, the specular reflections or glints within the image are detected. Given a triplet of frames Fn, Fn+1 and Fn+2 (54-56), a set of 2D glints Gn, Gn+1 and Gn+2 is extracted as two-dimensional coordinates of pixels within the image. Glint extraction can be done using well known computer vision methods, such as the maximum of Laplacian operators. Those glints are either corresponding to a corneal reflection or any other specular reflection in the image. The number of glints detected within an image can range from a few to several hundred depending on the environment imaged and the lighting. In systems implementing multiple glint detection modules, the glint extraction process can be performed in parallel. Due to the small size of glints with an image, overlap of pixels between the separate modules can be significantly reduced.

At step 43, a motion model is used to determine which specular reflections correspond to corneal reflections (as opposed to other specular reflections such as from a person's glasses). An exemplary motion model is a constant velocity model of an eye. Another exemplary motion model is an acceleration model of an eye. Ideally, a minimum of 3 frames for constant velocity assumption are used, or 4 frames for constant acceleration assumptions. The preferred embodiment focuses on the constant velocity model, but extension to the constant acceleration or other motion models can be used. The model is applied by passing the captured image data through an algorithm run by processor 56. Each model applies constraints which relate to the typical motion of an eye. Corresponding motion models of other objects can be applied when tracking other objects within images.

It is necessary to consider whether any triplet of glints in consecutive frames is relevant. Where only one glint is picked per set Gn, Gn+1 and Gn+2, this involves trying to identify triplets corresponding to 3 consecutive corneal reflections on the same cornea. A first cull can occur at this stage to reject triplets where the glint position on two consecutive frames is greater than a predetermined threshold distance. For example, the threshold distance may be based on a distance derived by a maximum velocity of the cornea in 3D space. Assuming a known corneal radius R (which is very similar across the human population), a minimization process can then occur to determine the best cornea trajectory in 3D (6 degrees of freedom using a constant velocity model) that fit the triplet of glints (6 observations from 3×2D locations). Any iterative optimization process can be used at this stage (e.g. Levenberg-Marquardt) using the geometry of FIG. 3. For the embodiment shown in FIG. 4, a specific fast solution to the optimization problem can be used.

From a mathematical perspective, the trajectory of the cornea can be computed from a sequence of 2D glints locations captured by a system as illustrated in FIG. 3, with the following considerations:

A camera I with known intrinsic projection parameters θ.
A reference frame F aligned with the camera axis (X,Y parallel to the image plane, Z collinear with the optical axis of the camera) and centred on the camera centre of projection.
An infrared illuminator located at a known 3D location L in the camera reference frame F.
A spherical cornea of known radius R, whose center is following a trajectory C={$C_1, \ldots, C_n$} in the reference frame F in a sequence of images.
A motion model $C_i$=g(α, i) where α are the motion parameters (e.g. constant velocity or constant acceleration) describing the trajectory C.
A sequence of 2D glints locations G={$G_1, \ldots, G_n$} corresponding to the reflections of the light emanating from the infrared illuminator on the surface of the cornea as imaged by the camera.

Using well known reflective geometry of spherical mirrors and projective geometry of cameras, there is a known function $\overline{G_i}$=f (L, R, α, θ, i) where $\overline{G_i}$ is the theoretical location of the specular reflection $G_i$. The parameters of the cornea trajectory can then be computed by minimizing the error function:

$$\min_\alpha \sum_{i=1}^{n} (G_i - \overline{G_i})^2$$

The minimum of this function can be found using well-known optimization techniques. Once the parameter $\alpha_{min}$ is found the trajectory T of the cornea can be computed using the known motion model.

Note that for simplification the cornea is assumed to be a sphere of known radius R. However, as mentioned above, the method remains valid for any other parametric shape of the cornea (e.g. ellipsoid) as long as the theoretical location $\overline{G_i}$ of the glint can be computed from the known position (and optionally orientation) of the cornea.

The above culling process will often reduce the number of candidate glints down to about 3 or 4. For glints that pass the distance or trajectory assessment described above, the triplet of glints can then be rejected or accepted based on other predetermined criteria. For example, a maximum threshold on the residuals from the optimization (the error between the observed 2D positions of the glints and their optimized 2D positions computed from the optimized 3D cornea trajectory) can be set. Other thresholds on the optimized cornea trajectory can also be set, like the minimum and maximum depth or velocity.

The triplets that pass all the acceptance criteria are considered to be from actual corneal reflections and therefore both the 2D position of the eye and the 3D location of the cornea have been computed. In one embodiment, 2 consecutive glint triplets can then be assessed as a quadruplet using another motion model (e.g. constant velocity or constant acceleration) to further check for false positive detections.

The proposed method detects any reflective object with a curvature similar to that of a cornea. It can also occasionally produce false positives in the presence of noise (high number of specular reflections) in the images. In such cases, further image analysis, like machine learning based classifiers or appearance based criteria, can be employed to eliminate unwanted false positives.

Finally, at step 44 the eye position determined from the corneal reflections is output. The output data is in the form of either a three-dimensional coordinate of the cornea position in the camera reference frame or a two-dimensional projection in the image. These coordinates may be subsequently used to project the eye positions back onto the image or another image in the time series. Further, the coordinates of the detected eyes may be used to determine a gaze direction through further analysis of the images.

It will be appreciated that the embodiments described herein provide various useful method of determining the position of eyeballs within an image. The invention has applications for any computer vision based face or eye tracking systems that require the detection of eye(s) and/or face(s). It is particularly useful where the face is partially occluded (for example, where the user is wearing a dust or hygienic mask), not entirely visible (for example, a portion of the face is out of the field of view of the camera), or the eye texture is partially occluded by glasses rims and reflections on the lenses. Exemplary applications include vehicle operator monitoring systems for detecting signs of fatigue or distraction, gaze tracking systems that computing gaze direction (on 2D screens or in 3D environments) for ergonomic or human behavioural studies, face tracking systems for virtual glasses try-out, and face tracking systems for avatar animation.

The present invention is able to be performed in systems having a single glint detection module or a plurality of glint detection modules running in parallel. In parallel embodiments, the abovementioned overlap problem associated with prior art techniques is significantly reduced because the glint is a very small feature in the image even at close range (in some embodiments, typically 3 or 4 pixels in diameter). As such, it is possible to allow the detector region overlap to be very small. If the same glint is detected by multiple glint detectors, then any ambiguity is resolved in the cornea trajectory fitting process.

In addition, in contrast to certain prior art systems, where the eye detector operates on multiple frames and the eye is moving through regions of multiple detectors, the system and method of the invention is still able to fit a trajectory to the detected glints from the plurality of glint detectors (removing many false eye candidates) and thereby creating a single candidate solution for the eye validation phase to operate over. This makes the process of validating any region containing an eye much more likely to return positive results with less processing time, when the eye is moving.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of distinguishing corneal reflections from other non-corneal specular reflections within a time series of image frames, the method including the steps of:
 (a) capturing, by at least one image sensor, a time series of image frames of an image area including one or both eyeballs of a subject, the image area being illuminated in a predetermined temporal manner by at least two spaced apart light sources;

(b) processing the time series of image frames to determine two dimensional coordinates of pixels corresponding to specular reflection locations in each of the image frames to thereby generate a time series evolution of the location of the specular reflections;

(c) applying one or more constraints relating to a typical motion of an eyeball to the two dimensional coordinates of pixels corresponding to the identified specular reflections across consecutive image frames; and (d) rejecting specular reflections where the two dimensional coordinates across consecutive images is greater than a predetermined threshold distance to isolate corneal reflections from other non-corneal specular reflections from the determined specular reflection locations in the image frames, wherein the corneal reflections correspond to reflections of light emanating from one of the light sources on the surface of a cornea of one of the eyeballs as imaged by the camera.

2. The method as claimed in claim 1 wherein the step (c) includes utilizing either a velocity or acceleration model of position evolution to model the location of the specular reflections corresponding to corneal reflections.

3. The method as claimed in claim 2 wherein an error measure between said model and the actual locations of the specular reflections in the image frames is utilized.

4. The method as claimed in claim 2 wherein said model includes maximum velocity or acceleration of a cornea in 3D space.

5. The method as claimed in claim 1 including first and second light sources, wherein the first light source is actuated to illuminate one or both of the eyeballs during capture of even frames of the time series and the second light source is actuated to illuminate one or both of the eyeballs during capture of odd frames of the time series.

6. The method as claimed in claim 1 including a plurality of light sources, each light source being actuated to illuminate one or both of the eyeballs during capture of predetermined frames of the time series.

7. The method as claimed in claim 1, wherein the specular reflections are reflection images of the at least two spaced apart light sources.

8. The method as claimed in claim 1, wherein the corneal reflections are used to identify eyes through the series of images.

9. The method according to claim 1, wherein step (g) also includes outputting a three dimensional coordinate of the cornea position in a frame of reference of the camera.

10. An image processing system for distinguishing corneal reflections of an eyeball from other non-corneal specular reflections within a series of temporal image frames, the system including:

at least two spaced apart light sources for illuminating an image area, including the eyeball, during respective predetermined time periods;

an image sensor for capturing an image during each of the predetermined time periods, the image forming part of the series of temporal image frames of the image area;

a processor configured to process the time series of temporal image frames to:

determine two dimensional coordinates of pixels corresponding to specular reflection locations in each of the temporal image frames:

apply one or more constraints relating to a typical motion of an eyeball to the two dimensional coordinates corresponding to the identified specular reflections across consecutive image frames; and reject specular reflections where the two dimensional coordinates across consecutive image frames is greater than a predetermined threshold distance to isolate corneal reflections from non-corneal specular reflections from the determined specular reflection locations, wherein the corneal reflections correspond to reflections of light emanating from one of the light sources on the surface of the cornea as imaged by the camera.

11. A method of tracking one or more eyes of a subject within a series of images, the method including the steps of:

(a) controlling at least two spaced apart light sources to illuminate the one or more eyes during respective predetermined time periods;

(b) during each of the predetermined time periods, controlling a camera to capture an image including the one or more eyes, the image forming part of the series of images;

(c) identifying specular reflections present in each of the images;

(d) extracting two dimensional coordinates of pixels within each image corresponding to the identified specular reflections;

(e) applying one or more constraints relating to a typical motion of an eye to the two dimensional coordinates of pixels corresponding to the identified specular reflections across consecutive images;

(f) rejecting specular reflections where the two dimensional coordinates across consecutive images is greater than a predetermined threshold distance to distinguish corneal reflections originating from the one or more eyes from non-corneal specular reflections, the corneal reflections corresponding to the reflections of light emanating from one of the light sources on the surface of the cornea as imaged by the camera; and (g) outputting two-dimensional coordinates of the position of the one or more eyes in at least a subset of the images based on the two dimensional coordinates corresponding to corneal reflections.

12. The method according to claim 11 wherein the step of applying one or more constraints includes applying a motion model of the one or more eyes based on the position of the specular reflections in a plurality of images.

13. A computer system configured to perform a method according to claim 8, said computer system comprising a processor configured to carry out the method according to claim 11.

14. A device configured to perform a method according to claim 11, said device comprising a processor configured to carry out the method according to claim 11.

15. The method according to claim 11, wherein step (d) includes utilizing either a velocity or acceleration model of position evolution to model the location of the specular reflections corresponding to corneal reflections.

* * * * *